April 7, 1936.                    J. HONN                    2,036,807
RAKE
Filed Nov. 16, 1935
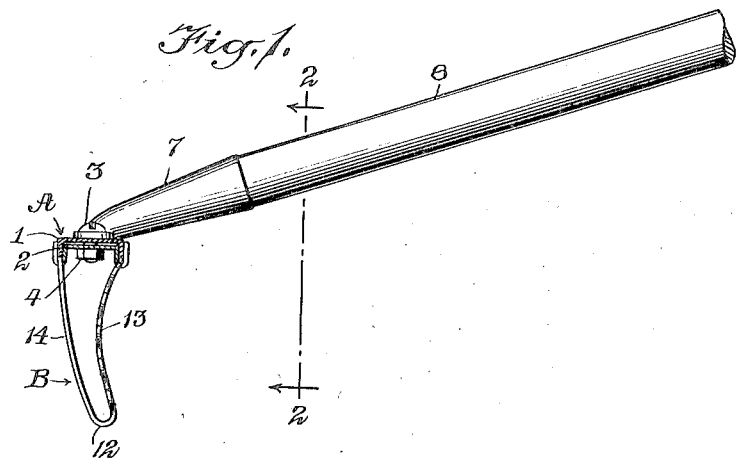
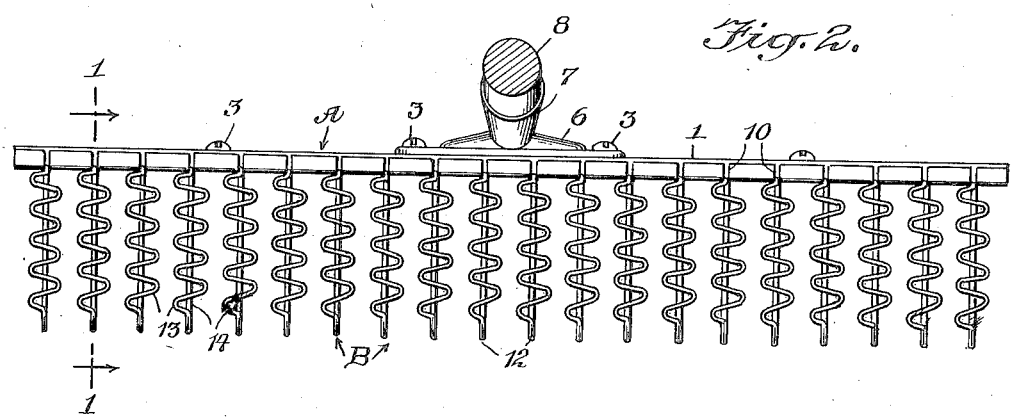
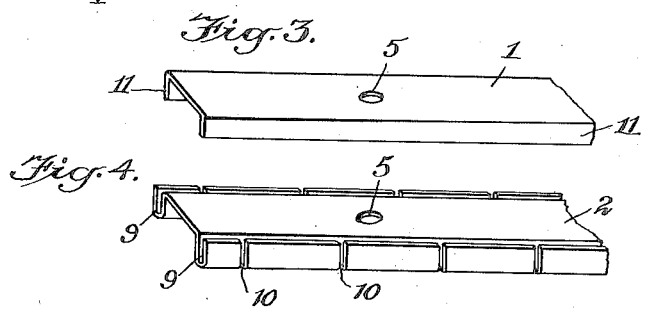
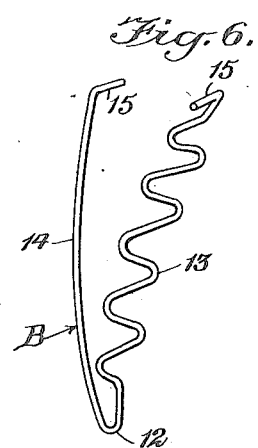
WITNESSES
INVENTOR
Joseph Honn
BY
ATTORNEYS Patented Apr. 7, 1936

2,036,807

UNITED STATES PATENT OFFICE 2,036,807

RAKE

Joseph Honn, Kansas City, Mo.

Application November 16, 1935, Serial No. 50,221

3 Claims. (Cl. 55—10)

This invention relates to rakes, an object of the invention being to provide a rake having an improved construction of head and an improved construction and arrangement of tines, comprising a device which can be readily operated to rake leaves or other articles and which will not unduly clog.

More specifically the invention includes a series of tines composed of spring wire bent intermediate their ends forming front and rear runs located in longitudinal alignment and having tongues at their ends for coupling engagement with the head. Tines of this character have many features of advantages, some of which may be enumerated as follows: A double-run tine can be made of smaller wire than is ordinarily required, and, at the same time, have the necessary strength and durability; a broken tine can be easily replaced; the construction of tine prevents catching upon obstacles in the lawn, and, furthermore, when the rake becomes clogged a movement of the hand across the tines will cause them to vibrate and clean the rake quickly.

My invention, therefore, includes a novel construction of head and specific form of tine, all of which will be more fully hereinafter described and pointed out in the claims.

In the accompanying drawing—

Figure 1 is a sectional elevation, the view being taken on the line 1—1 of Fig. 2;

Fig. 2 is a sectional elevation at right angles to Fig. 1, the view being taken on the line 2—2 of Fig. 1;

Fig. 3 is a fragmentary perspective view illustrating the upper bar of the rake head;

Fig. 4 is a similar view illustrating the lower bar of the rake head;

Fig. 5 is a detail view partly in elevation and partly in section illustrating the manner of securing a tine in the head;

Fig. 6 is a perspective view of the preferred form of my improved tine.

The reference character A is employed to indicate generally the head of my improved rake and B the tines. The head of the rake comprises upper and lower bars 1 and 2 secured together by bolts 3 and nuts 4, said bolts projecting through openings 5 in the bars and hence the bars can be readily separated or connected as desired. Certain of the bolts 3 may be utilized to secure a bracket 6 to the head, which bracket is formed with a ferrule 7 to receive a handle 8. The lower bar 2 is provided at its front and rear edges with gutters 9, these gutters being formed by bending the bar first downwardly and then upwardly at its edges, and the outer portions of the gutters are notched as shown at 10. The upper bar 1 is of generally inverted channel shape and its flanges 11 are adapted to enter the gutters 9 and clamp the tines in the gutters.

Each tine comprises a single piece of spring wire bent intermediate its ends as shown at 12, forming front and rear runs 13 and 14 and the upper extremities of these runs are bent at an angle forming tongues 15 which, when the upper portions of the runs are located in the notches 10, lie in the gutters 9 and are securely clamped by the flanges 11 of the bar 1. Both runs of each tine are curved longitudinally in the same general direction and the runs of the tines are in longitudinal alignment. The front run of the tine is preferably transversely waved or crimped in a zigzag manner providing a plurality of lateral bends, as illustrated clearly in Figs. 2 and 6 of the drawing and this shape of front run of the tine offers a wide surface to pick up leaves or other articles and to prevent entanglement in the rake.

It is, of course, obvious that the exact shape of the tine may be varied and the exact manner of coupling the same to the head may be varied without departing from the invention, and hence I do not limit myself to the specific details set forth but consider myself at liberty to make such changes and alterations as fairly fall within the spirit and scope of the appended claims.

I claim:

1. A rake, including a head and a series of tines secured to the head, each tine composed of a single piece of spring wire bent intermediate its ends forming front and rear runs, both runs curved throughout their length, the front run having a plurality of lateral bends therein.

2. A rake, including a head composed of upper and lower bars, the lower bar having enlarged gutters at its front and rear edges, the upper bar having flanges at its front and rear edges entering the gutters, tines in the enlarged gutters, and separable devices securing the bars together and clamping the tines to the head.

3. A rake, including a head composed of upper and lower bars, the lower bar having enlarged gutters at its front and rear edges, the upper bar having flanges at its front and rear edges entering the gutters, tines in the enlarged gutters, separable devices securing the bars together and clamping the tines to the head, and laterally projecting tongues at the upper ends of the tines lying in the gutters below the flanges of the upper bar.

JOSEPH HONN.